(12) United States Patent
Hirukawa

(10) Patent No.: US 10,673,061 B2
(45) Date of Patent: Jun. 2, 2020

(54) ELECTRODE SHEET MANUFACTURING METHOD

(71) Applicant: TOYOTA JIDOSHA KABUSHIKI KAISHA, Toyota-shi, Aichi-ken (JP)

(72) Inventor: Tomofumi Hirukawa, Miyoshi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 145 days.

(21) Appl. No.: 16/032,549

(22) Filed: Jul. 11, 2018

(65) Prior Publication Data

US 2019/0036104 A1    Jan. 31, 2019

(30) Foreign Application Priority Data

Jul. 31, 2017    (JP) ................................. 2017-147391

(51) Int. Cl.
| | |
|---|---|
| *H01M 4/04* | (2006.01) |
| *H01M 4/36* | (2006.01) |
| *H01M 4/62* | (2006.01) |
| *H01M 10/0525* | (2010.01) |
| *H01M 4/505* | (2010.01) |
| *H01M 4/525* | (2010.01) |
| *H01M 4/02* | (2006.01) |
| *H01M 4/66* | (2006.01) |

(52) U.S. Cl.
CPC ....... *H01M 4/0435* (2013.01); *H01M 4/0404* (2013.01); *H01M 4/0411* (2013.01); *H01M 4/364* (2013.01); *H01M 4/622* (2013.01); *H01M 4/505* (2013.01); *H01M 4/525* (2013.01); *H01M 4/623* (2013.01); *H01M 4/661* (2013.01); *H01M 10/0525* (2013.01); *H01M 2004/027* (2013.01); *H01M 2004/028* (2013.01)

(58) Field of Classification Search
CPC ............ H01M 4/0435; H01M 4/0404; H01M 4/0409; H01M 4/0411; H01M 4/043; H01M 4/505; H01M 4/525; H01M 4/623; H01M 4/661; H01M 10/0525; H01M 2004/027; H01M 2004/028
See application file for complete search history.

(56) References Cited

U.S. PATENT DOCUMENTS

2016/0141597 A1* 5/2016 Umeyama ........... H01M 4/0435
156/62.2

FOREIGN PATENT DOCUMENTS

| JP | 11-003701 A | 1/1999 |
|---|---|---|
| JP | 2010287405 A | * 12/2010 |
| JP | 2013-052353 A | 3/2013 |

(Continued)

*Primary Examiner* — Gregg Cantelmo
(74) *Attorney, Agent, or Firm* — Sughrue Mion, PLLC

(57) ABSTRACT

A method includes performing roll pressing such that a first electrode mixture layer and a second electrode mixture layer are compressed in a thickness direction of the first electrode mixture layer and the second electrode mixture layer by passing an electrode sheet through a gap between a seventh roll and an eighth roll facing each other and rotating. When performing the roll pressing, T7 as a surface temperature of the seventh roll disposed on the first electrode mixture layer side and contacting the first electrode mixture layer and T8 as a surface temperature of the eighth roll disposed on the second electrode mixture layer side and contacting the second electrode mixture layer satisfy a relationship of T7<T8.

4 Claims, 8 Drawing Sheets

(56) References Cited

FOREIGN PATENT DOCUMENTS

| JP | 2013077560 A | * | 4/2013 |
| JP | 2014-102992 A | | 6/2014 |
| JP | 2015-201318 A | | 11/2015 |
| JP | 6284020 B2 | * | 2/2018 |

* cited by examiner

ELECTRODE SHEET MANUFACTURING METHOD

INCORPORATION BY REFERENCE

The disclosure of Japanese Patent Application No. 2017-147391 filed on Jul. 31, 2017 including the specification, drawings and abstract is incorporated herein by reference in its entirety.

BACKGROUND

1. Technical Field

The disclosure relates to a method of manufacturing an electrode sheet that constitutes a battery. More specifically, the disclosure relates to a method of manufacturing an electrode sheet having a first electrode mixture layer on a first surface of a collector foil and a second electrode mixture layer on a second surface of the collector foil.

2. Description of Related Art

As an electrode sheet (positive electrode sheet or negative electrode sheet), there is known an electrode sheet having a first electrode mixture layer on a first surface of a collector foil and a second electrode mixture layer on a second surface of the collector foil. As a method of manufacturing an electrode sheet having such a structure, there is known a method as disclosed in, for example, Japanese Unexamined Patent Application Publication No. 2013-052353 (JP 2013-052353 A). Specifically, first, an electrode mixture containing a plurality of wet granules obtained by mixing and granulating an electrode active material, a binder, and a solvent is produced. Then, in a first film forming process, while the electrode mixture is formed into a film shape by passing the electrode mixture through a gap between a first roll and a second roll facing each other and rotating, the film-shaped electrode mixture is adhered to a surface of the second roll. Further, while a second surface of a collector foil conveyed by a third roll facing the second roll and rotating is brought in contact with a surface of the third roll, the collector foil is passed through a gap between the second roll and the third roll. Consequently, the film-shaped electrode mixture adhering to the surface of the second roll is pressed against a first surface of the collector foil so as to be transferred to the first surface of the collector foil, thereby producing a first electrode mixture layer coated collector foil in which a first electrode mixture layer is formed on the first surface of the collector foil.

Further, in a second film forming process, while the electrode mixture is formed into a film shape by passing the electrode mixture through a gap between a fourth roll and a fifth roll facing each other and rotating, the film-shaped electrode mixture is adhered to a surface of the fifth roll. Further, while the first electrode mixture layer of the first electrode mixture layer coated collector foil conveyed by a sixth roll facing the fifth roll and rotating is brought in contact with a surface of the sixth roll, the first electrode mixture layer coated collector foil is passed through a gap between the fifth roll and the sixth roll. Consequently, the film-shaped electrode mixture adhering to the surface of the fifth roll is pressed against the second surface of the collector foil so as to be transferred to the second surface of the collector foil, thereby producing an electrode sheet in which a second electrode mixture layer is formed on the second surface of the first electrode mixture layer coated collector foil.

SUMMARY

In the meantime, in the electrode sheet produced as described above, there are cases where the density of the first electrode mixture layer formed on the first surface of the collector foil becomes higher than the density of the second electrode mixture layer formed on the second surface of the collector foil so that the large density difference occurs between the first and second electrode mixture layers. This is because since the first electrode mixture layer is formed by compression of the electrode mixture between the second roll and the third roll in the first film forming process and is further compressed between the fifth roll and the sixth roll when the second electrode mixture layer is formed in the second film forming process, the compressibility of the first electrode mixture layer becomes higher (the porosity of the first electrode mixture layer becomes lower) than that of the second electrode mixture layer. Therefore, in the electrode sheet produced as described above, the density of the first electrode mixture layer becomes higher than the density of the second electrode mixture layer. There is a tendency that the greater the density difference between a first electrode mixture layer and a second electrode mixture layer in an electrode sheet, the faster the deterioration of a battery using such an electrode sheet. Therefore, the density difference between the first electrode mixture layer and the second electrode mixture layer is required to be reduced in the electrode sheet produced as described above.

The disclosure provides an electrode sheet manufacturing method that can reduce the density difference between a first electrode mixture layer and a second electrode mixture layer.

An aspect of the disclosure relates to a method of manufacturing an electrode sheet including a first electrode mixture layer on a first surface of a collector foil having the first surface and a second surface, and a second electrode mixture layer on the second surface. The method includes: performing first film formation such that while an electrode mixture containing a plurality of wet granules obtained by mixing and granulating an electrode active material, a binder, and a solvent is formed into a film shape by passing the electrode mixture through a gap between a first roll and a second roll facing each other and rotating, the electrode mixture formed into the film shape is adhered to a surface of the second roll, and that while the second surface of the collector foil conveyed by a third roll facing the second roll and rotating is brought in contact with a surface of the third roll, the collector foil is passed through a gap between the second roll and the third roll to cause the film-shaped electrode mixture adhering to the surface of the second roll to be pressed against and transferred to the first surface of the collector foil so as to produce a first electrode mixture layer coated collector foil in which the first electrode mixture layer is formed on the first surface of the collector foil; performing second film formation such that while the electrode mixture is formed into a film shape by passing the electrode mixture through a gap between a fourth roll and a fifth roll facing each other and rotating, the electrode mixture formed into the film shape is adhered to a surface of the fifth roll, and that while the first electrode mixture layer of the first electrode mixture layer coated collector foil conveyed by a sixth roll facing the fifth roll and rotating is brought in contact with a surface of the sixth roll, the first electrode mixture layer coated collector foil is passed through a gap between the fifth roll and the sixth roll to cause the film-shaped electrode mixture adhering to the surface of the fifth roll to be pressed against and transferred to the second surface of the first electrode mixture layer coated collector foil so as to produce the electrode sheet in which the second electrode mixture layer is formed on the second surface of the first electrode mixture layer coated collector foil; and performing roll pressing such that the first electrode mixture layer and the second electrode mixture layer are compressed in a thickness direction of the first electrode mixture layer and the second electrode mixture layer by passing the electrode sheet through a gap between a seventh roll and an eighth roll facing each other and rotating, wherein when performing the roll pressing, T7 as a surface temperature of the seventh roll disposed on a first electrode mixture layer side and contacting the first electrode mixture layer and T8 as a surface temperature of the eighth roll disposed on a second electrode mixture layer side and contacting the second electrode mixture layer satisfy a relationship of T7<T8.

In the above-described manufacturing method, the electrode sheet (before the roll pressing) is produced by performing the first film formation and the second film formation described above. In the electrode sheet thus produced in the related art, there are cases where the density of the first electrode mixture layer formed on the first surface of the collector foil becomes higher than the density of the second electrode mixture layer formed on the second surface of the collector foil so that the large density difference occurs between the first and second electrode mixture layers.

In this regard, the above-described manufacturing method includes performing the roll pressing such that the first electrode mixture layer and the second electrode mixture layer are compressed in the thickness direction of the first electrode mixture layer and the second electrode mixture layer by passing the electrode sheet through the gap between the seventh roll and the eighth roll facing each other and rotating after the second film formation. Further, when performing the roll pressing, T7 as the surface temperature of the seventh roll disposed on the first electrode mixture layer side and contacting the first electrode mixture layer and T8 as the surface temperature of the eighth roll disposed on the second electrode mixture layer side and contacting the second electrode mixture layer satisfy the relationship of T7<T8.

In this way, by setting T8 as the surface temperature of the eighth roll brought in contact with the second electrode mixture layer having the relatively low density to be higher than T7 as the surface temperature of the seventh roll brought in contact with the first electrode mixture layer having the relatively high density, the compression can be performed while the temperature of the second electrode mixture layer is made higher than the temperature of the first electrode mixture layer. Consequently, in the roll pressing, the compression can be performed while the second electrode mixture layer is made softer than the first electrode mixture layer, and accordingly, the second electrode mixture layer is compressed more easily than the first electrode mixture layer. As a result, in the electrode sheet after performing the roll pressing, the density difference between the first electrode mixture layer and the second electrode mixture layer is reduced compared to the electrode sheet before performing the roll pressing. As described above, according to the above-described electrode sheet manufacturing method, it is possible to reduce the density difference between the first electrode mixture layer and the second electrode mixture layer.

The first film formation can be performed using, for example, a roll film forming apparatus having the first roll, the second roll, and the third roll. The second film formation can be performed using, for example, a roll film forming apparatus having the fourth roll, the fifth roll, and the sixth roll. The roll film forming apparatus for use in performing the first film formation and the roll film forming apparatus for use in performing the second film formation may be the same roll film forming apparatus. In this case, the first roll and the fourth roll are the same roll, the second roll and the fifth roll are the same roll, and the third roll and the sixth roll are the same roll. However, in the second film formation, the gap between the second roll and the third roll (the gap between the fifth roll and the sixth roll) is set to be greater than the gap therebetween in the first film formation. This is because the thickness of the first electrode mixture layer coated collector foil that is passed through the gap between the fifth roll and the sixth roll in the second film formation is greater than the thickness of the collector foil that is passed through the gap between the second roll and the third roll in the first film formation.

The wet granules are each a substance (granular body) in which the solvent and particles of the electrode active material are collected (joined) together in the state where the solvent and the particles of the electrode active material are held (absorbed) by the binder. In the above-described manufacturing method, first drying for drying the first electrode mixture layer formed on the first surface may be provided after the first film formation and before the second film formation. Further, second drying for drying the second electrode mixture layer formed on the second surface may be provided after the second film formation and before the roll pressing.

In the electrode sheet manufacturing method according to the aspect of the disclosure, when performing the roll pressing, T7 as the surface temperature of the seventh roll may be maintained at a temperature lower than (Ts-50)° C. being a temperature 50° C. lower than Ts as a softening temperature of the binder contained in the electrode mixture, and T8 as the surface temperature of the eighth roll may be maintained at a temperature equal to or higher than (Ts-50)° C.

In the above-described manufacturing method, when performing the roll pressing, T7 as the surface temperature of the seventh roll is maintained at the temperature lower than (Ts-50)° C. being the temperature 50° C. lower than Ts as the softening temperature of the binder contained in the electrode mixture, and further, T8 as the surface temperature of the eighth roll is maintained at the temperature equal to or higher than (Ts-50)° C. That is, the roll pressing is performed in the state where T7 as the surface temperature of the seventh roll brought in contact with the first electrode mixture layer having the relatively high density is maintained at the temperature lower than (Ts-50)° C., and T8 as the surface temperature of the eighth roll brought in contact with the second electrode mixture layer having the relatively low density is maintained at the temperature equal to or higher than (Ts-50)° C.

By maintaining T8 as the surface temperature of the eighth roll brought in contact with the second electrode mixture layer at the temperature equal to or higher than (Ts-50)° C., it is possible to soften the binder contained in the second electrode mixture layer so that the compressibility of the second electrode mixture layer can be increased. On the other hand, by maintaining T7 as the surface temperature of the seventh roll brought in contact with the first electrode mixture layer at the temperature lower than (Ts- 50)° C., it is possible to suppress softening of the binder contained in the first electrode mixture layer so that the compressibility of the first electrode mixture layer by the roll pressing can be made lower than the compressibility of the second electrode mixture layer by the roll pressing. As a result, in the electrode sheet after performing the roll pressing, the density difference between the first electrode mixture layer and the second electrode mixture layer is reduced compared to the electrode sheet before performing the roll pressing.

As the binder contained in the electrode mixture, polyvinylidene difluoride (PVdF), for example, can be cited. Ts as the softening temperature of PVdF is 150° C. Therefore, when PVdF is used as the binder, T7 as the surface temperature of the seventh roll is maintained at a temperature lower than (Ts-50)=150-50=100° C., and T8 as the surface temperature of the eighth roll is maintained at a temperature equal to or higher than (Ts-50)=100° C.

In the electrode sheet manufacturing method according to the aspect of the disclosure, when performing the roll pressing, T7 as the surface temperature of the seventh roll may be maintained at a temperature in a range from 15° C. to 35° C.

In the above-described manufacturing method, when performing the roll pressing, T7 as the surface temperature of the seventh roll is maintained at the temperature in the range from 15° C. to 35° C. (i.e. normal temperature). In this way, by maintaining T7 as the surface temperature of the seventh roll brought in contact with the first electrode mixture layer at the temperature in the range from 15° C. to 35° C., it is possible to suppress softening of the binder contained in the first electrode mixture layer at the time of the roll pressing so that the compressibility of the first electrode mixture layer by the roll pressing can be made lower than the compressibility of the second electrode mixture layer by the roll pressing. Consequently, in the electrode sheet after performing the roll pressing, the density difference between the first electrode mixture layer and the second electrode mixture layer can be reduced compared to the electrode sheet before performing the roll pressing.

In the electrode sheet manufacturing method according to the aspect of the disclosure, the seventh roll and the eighth roll may have a diameter of 300 mm or more.

In the above-described manufacturing method, the roll pressing is performed using the seventh roll and the eighth roll having the diameter (outer diameter) of 300 mm or more. By performing the roll pressing such that T7 as the surface temperature of the seventh roll and T8 as the surface temperature of the eighth roll, having the diameter of 300 mm or more, satisfy the relationship of T7<T8, the compressibility of the second electrode mixture layer by this roll pressing can be effectively increased. Consequently, it is possible to further reduce the density difference between the first electrode mixture layer and the second electrode mixture layer. Specifically, when the electrode sheet is passed through the gap between the seventh roll and the eighth roll so as to be pressed, the greater the diameter of the seventh roll and the eighth roll, the easier the first electrode mixture layer and the second electrode mixture layer are compressed in the thickness direction thereof and the more difficult the first electrode mixture layer and the second electrode mixture layer extend in the longitudinal direction thereof. This is because the greater the diameter of the seventh roll and the eighth roll, the more difficult the forces applied from the seventh roll and the eighth roll to the first electrode mixture layer and the second electrode mixture layer are applied in the rotational directions of the seventh roll and the eighth roll at the position of the gap between the seventh roll and the eighth roll (i.e. the longitudinal direction of the first electrode mixture layer and the second electrode mixture layer) and the easier the forces applied from the seventh roll and the eighth roll to the first electrode mixture layer and the second electrode mixture layer are applied in the thickness direction of the first electrode mixture layer and the second electrode mixture layer. Therefore, by performing the roll pressing using the seventh roll and the eighth roll having the diameter of 300 mm or more in the state where the second electrode mixture layer is more easily deformed than the first electrode mixture layer by causing T7 as the surface temperature of the seventh roll and T8 as the surface temperature of the eighth roll to satisfy the relationship of T7<T8, the compressibility of the second electrode mixture layer by the roll pressing can be effectively further increased compared to the compressibility of the first electrode mixture layer by the roll pressing. Consequently, it is possible to further reduce the density difference between the first electrode mixture layer and the second electrode mixture layer. Although the upper limit value of the diameter of the seventh roll and the eighth roll is not particularly limited, since a press apparatus that performs the roll pressing is preferably small, the diameter of the seventh roll and the eighth roll is preferably set to 500 mm or less.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
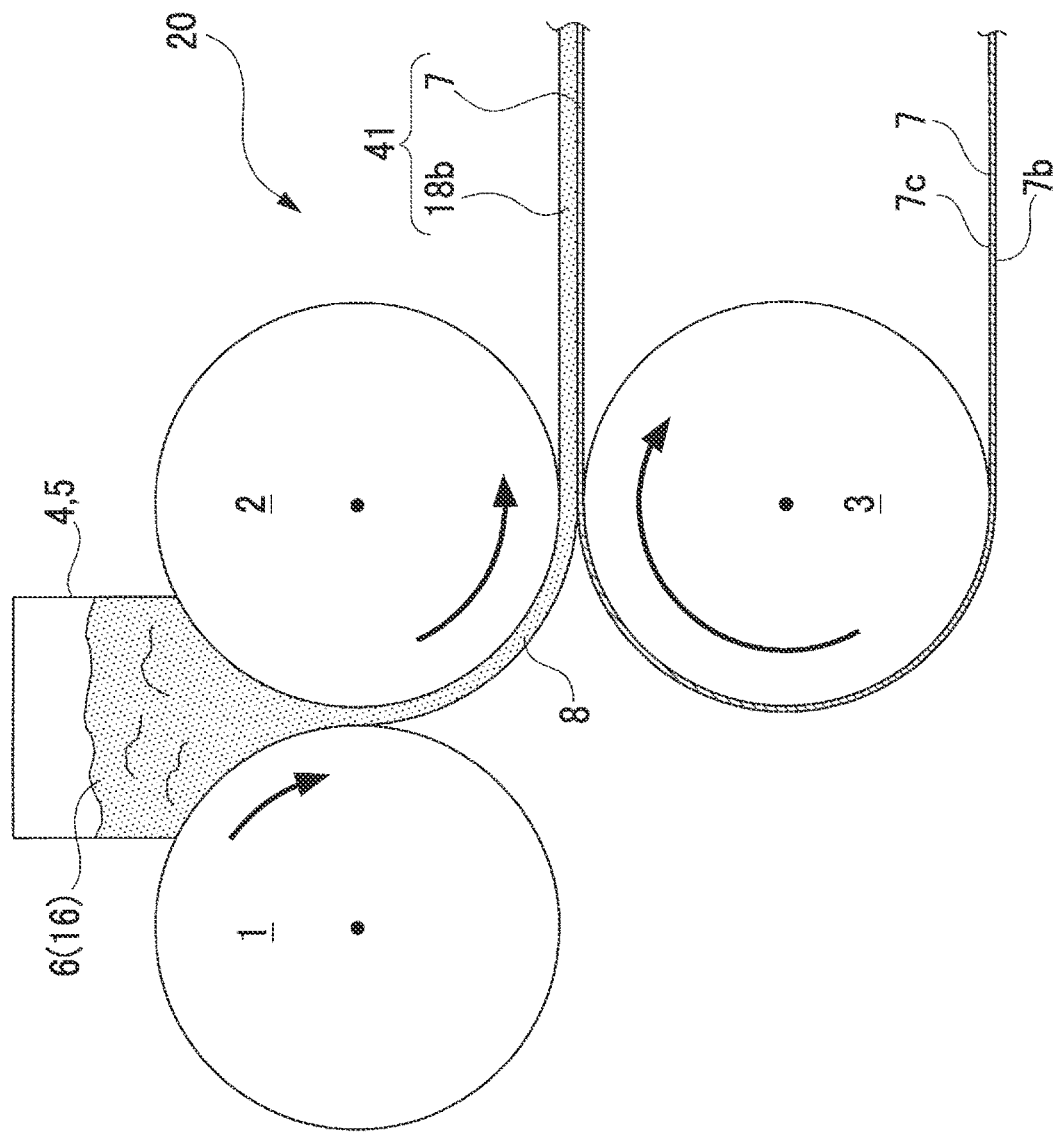
FIG. 1 is a schematic diagram of a first roll film forming apparatus according to an embodiment.

Hereinafter, an embodiment embodying the disclosure will be described in detail with reference to the drawings. In this embodiment, the disclosure is applied to the manufacture of a positive electrode sheet (electrode sheet) of a lithium-ion secondary battery. In this embodiment, as materials of a positive electrode mixture (electrode mixture) for forming a positive electrode mixture layer (electrode mixture layer) of the positive electrode sheet, a positive electrode active material (electrode active material), a conductive material, a binder, and a solvent are used.

In this embodiment, a lithium transition metal composite oxide (specifically, $LiNi_{1/3}Mn_{1/3}Co_{1/3}O_2$) in the form of powder is used as the positive electrode active material.

Acetylene black powder is used as the conductive material. Polyvinylidene difluoride (PVdF) is used as the binder. N-methylpyrrolidone (NMP) is used as the solvent.

In this embodiment, in an electrode mixture producing process, a large number of wet granules 16 are produced by mixing and granulating the materials described above, so that a positive electrode mixture 6 (electrode mixture) containing the large number of wet granules 16 is produced. Then, in a first film forming process, the positive electrode mixture 6 is adhered (coated) in a film shape on a first surface 7b of a collector foil 7, thereby producing a first positive electrode mixture layer coated collector foil 41 (first electrode mixture layer coated collector foil) in which a first positive electrode mixture layer 18b (first electrode mixture layer) is formed on the first surface 7b of the collector foil 7. Then, in a first drying process, the first positive electrode mixture layer 18b (first electrode mixture layer) on the first surface 7b of the collector foil 7 is dried.

Then, in a second film forming process, the positive electrode mixture 6 is adhered (coated) in a film shape on a second surface 7c of the first positive electrode mixture layer coated collector foil 41, thereby producing a positive electrode sheet 19 (electrode sheet) in which a second positive electrode mixture layer 18c (second electrode mixture layer) is formed on the second surface 7c. Then, in a second drying process, the second positive electrode mixture layer 18c (second electrode mixture layer) on the second surface 7c is dried. Thereafter, in a roll pressing process, the first positive electrode mixture layer 18b and the second positive electrode mixture layer 18c of the positive electrode sheet 19 are compressed in the thickness direction thereof. In this way, the positive electrode sheet 19 (electrode sheet) in which the density of the first positive electrode mixture layer 18b and the second positive electrode mixture layer 18c is increased is obtained.

Figure 2:
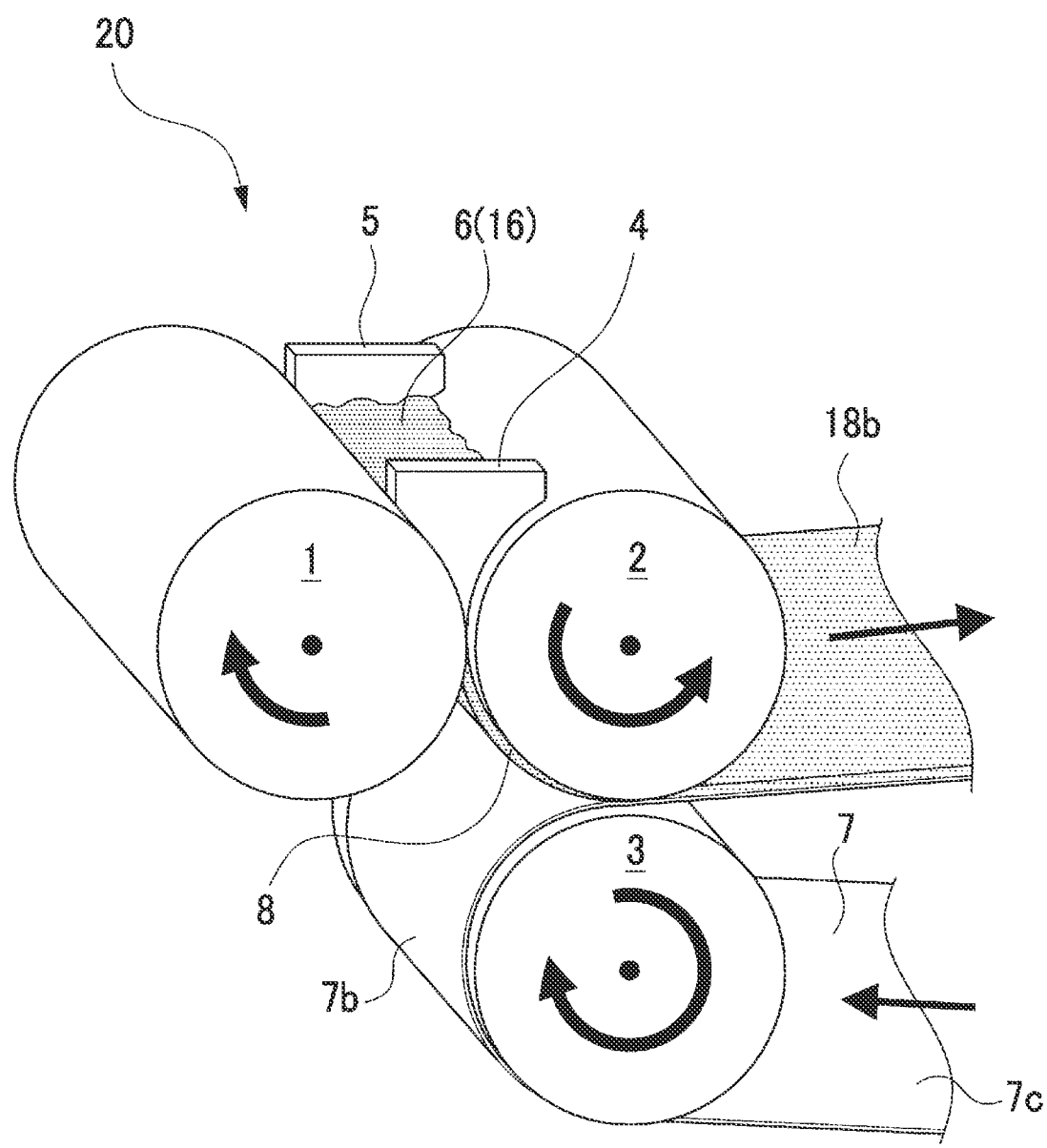
FIG. 2 is a perspective view of the first roll film forming apparatus according to the embodiment.
Figure 3:
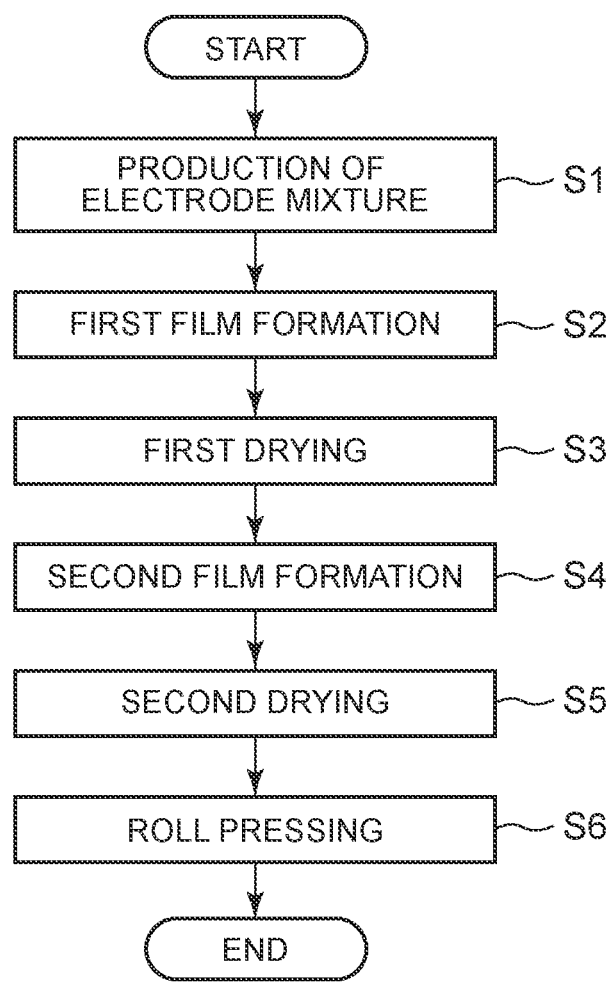
FIG. 3 is a flowchart showing the flow of an electrode sheet manufacturing method according to the embodiment.
Figure 4:
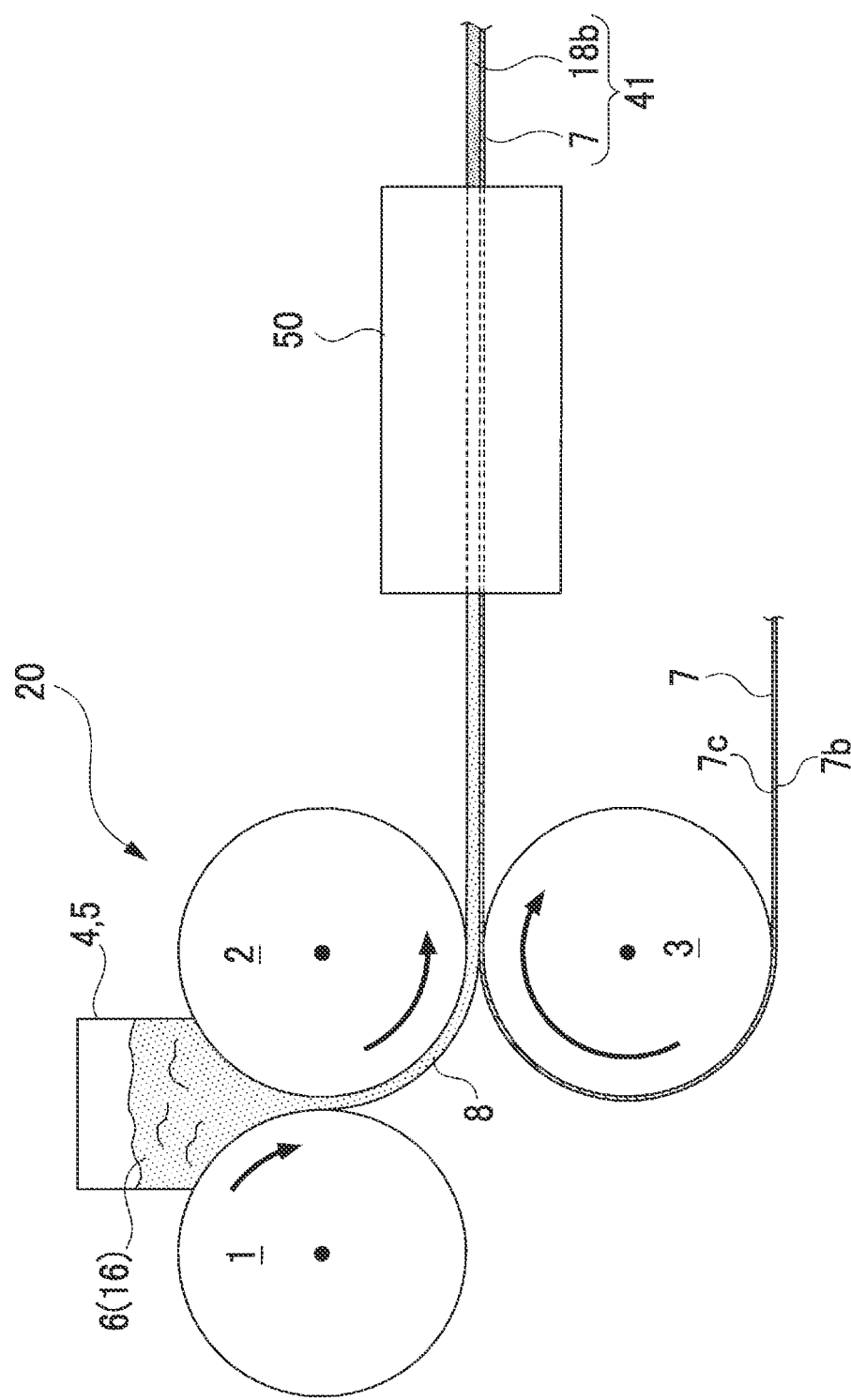
FIG. 4 is a schematic diagram of the first roll film forming apparatus and a first drying apparatus according to the embodiment.
Figure 5:
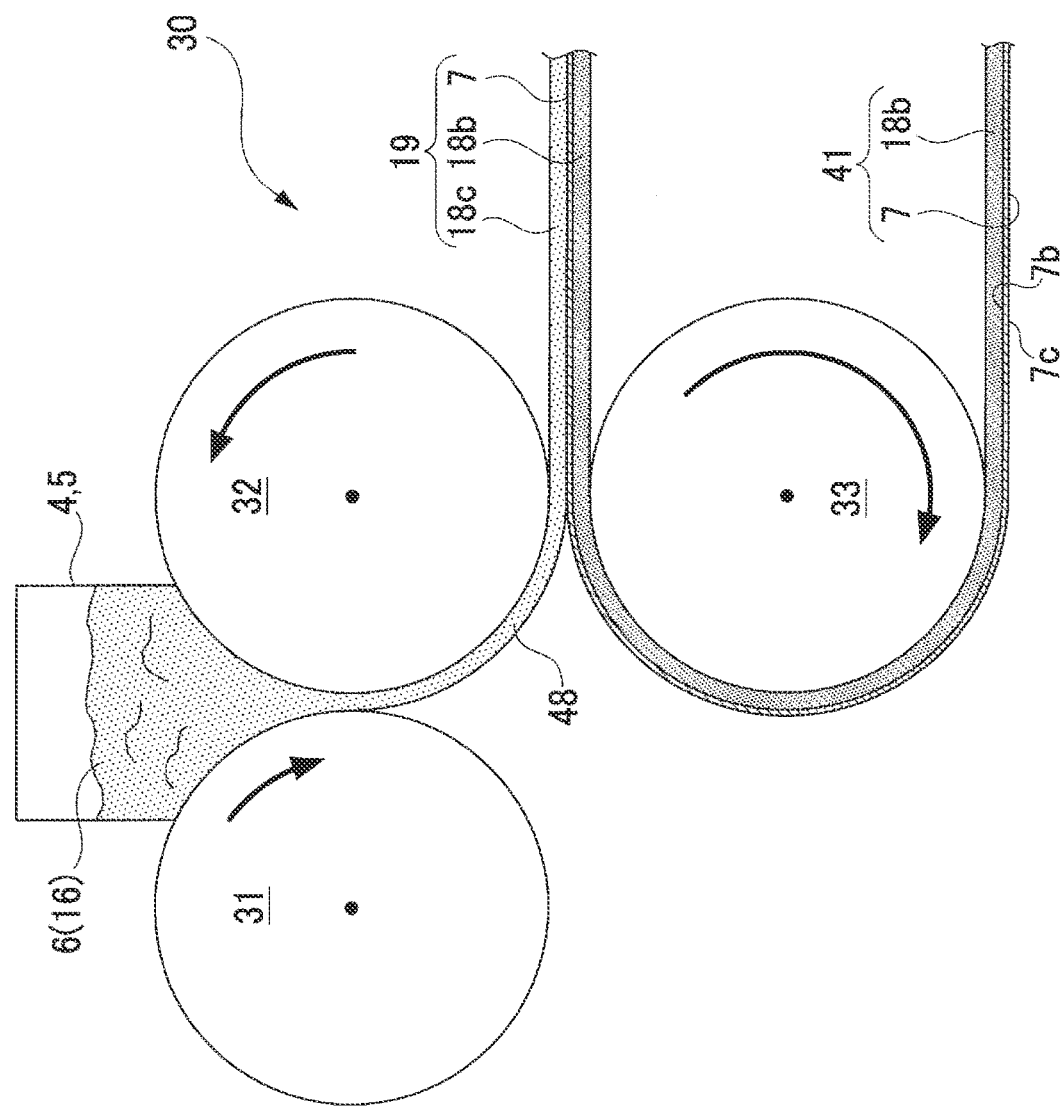
FIG. 5 is a schematic diagram of a second roll film forming apparatus according to the embodiment.
Figure 6:
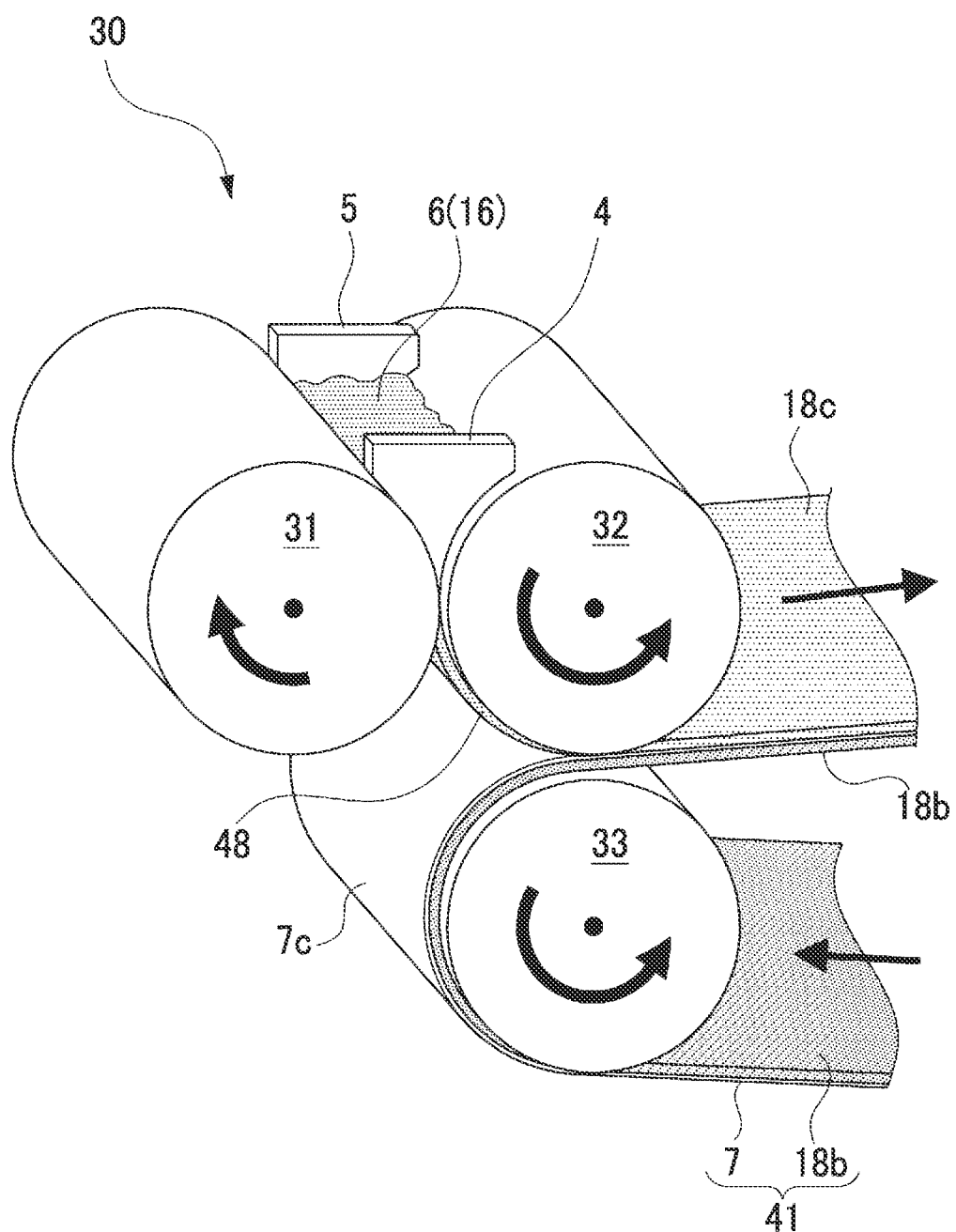
FIG. 6 is a perspective view of the second roll film forming apparatus according to the embodiment.
Figure 7:
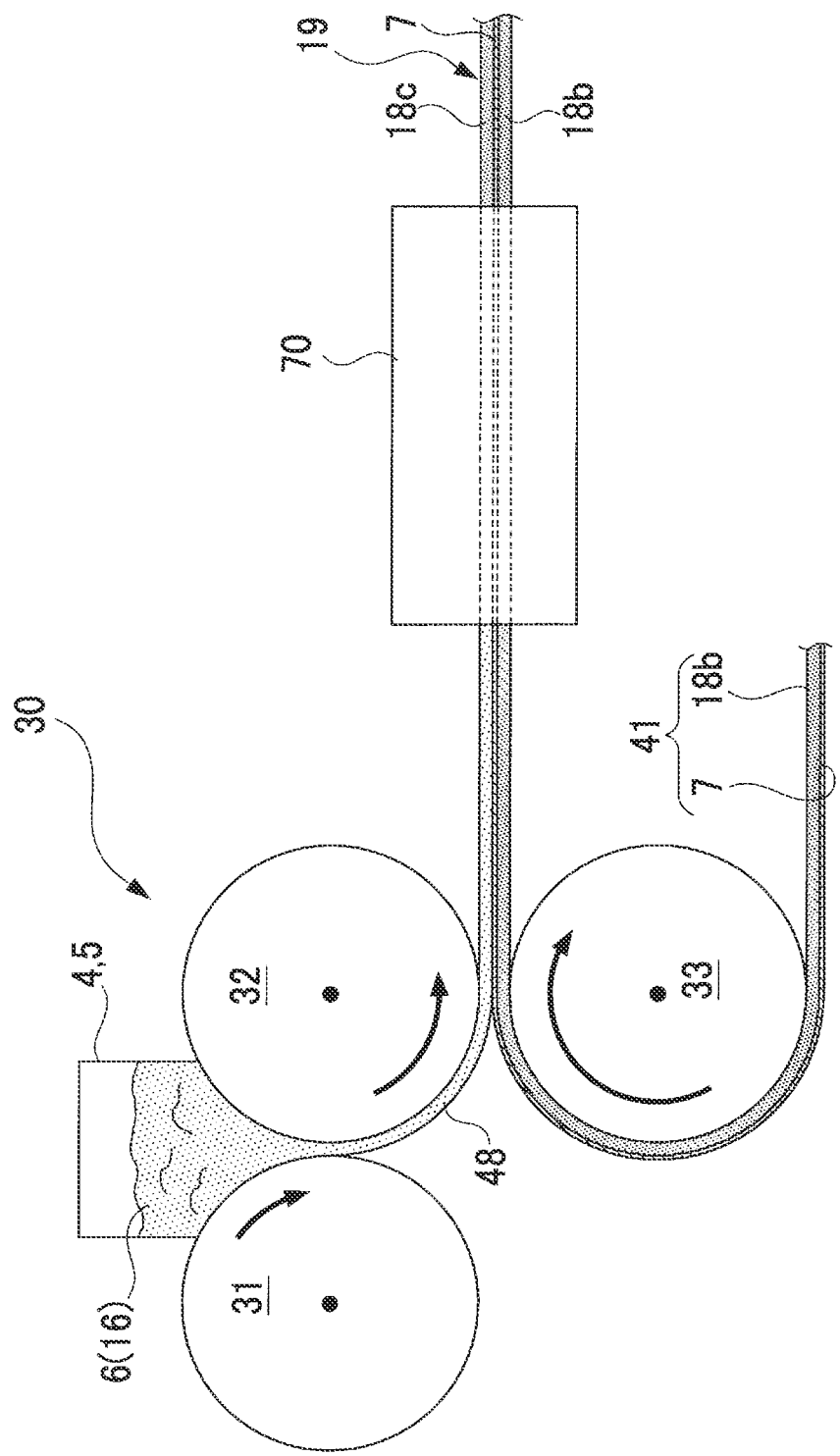
FIG. 7 is a schematic diagram of the second roll film forming apparatus and a second drying apparatus according to the embodiment.
Figure 8:
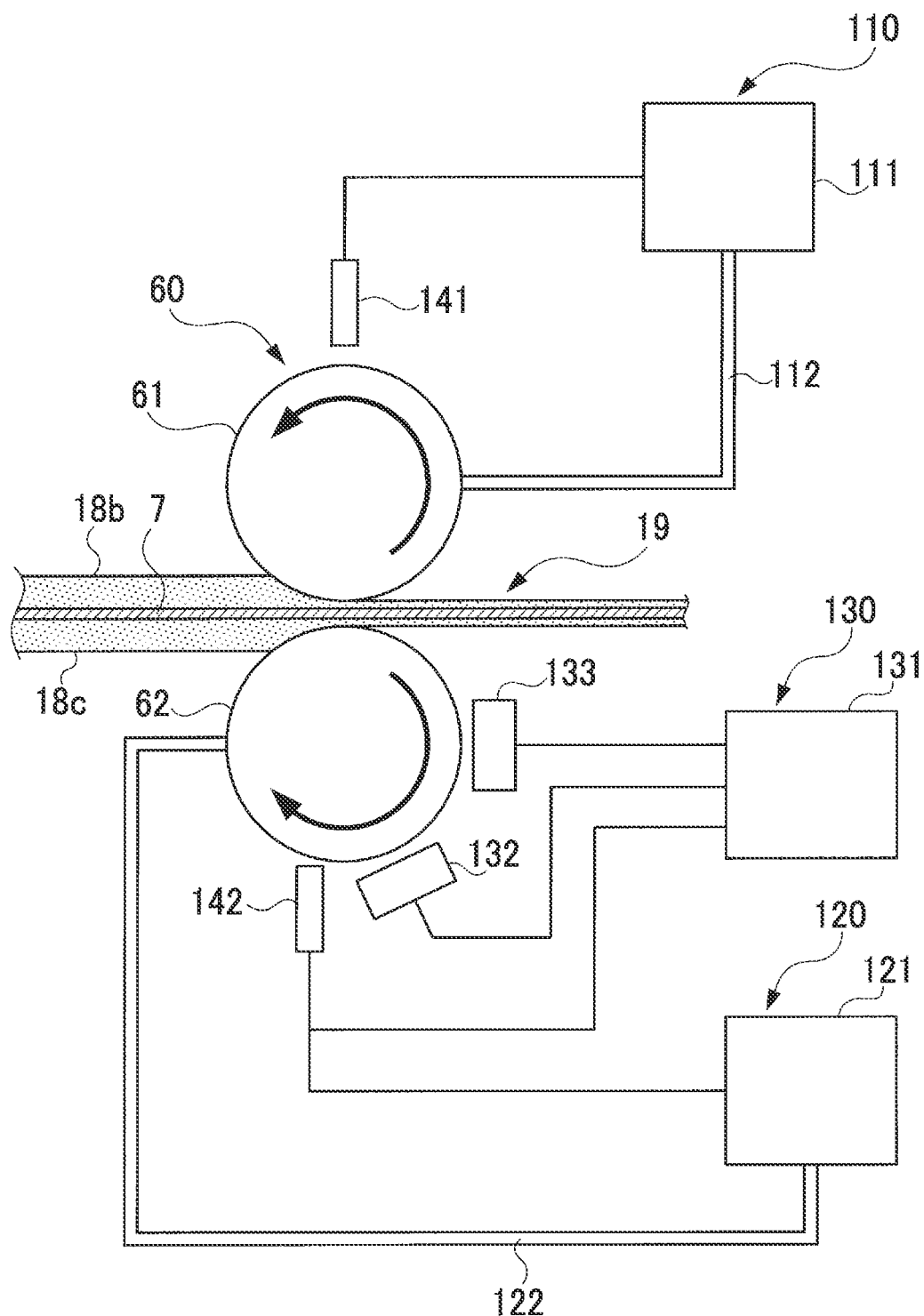
FIG. 8 is a schematic diagram of a press apparatus according to the embodiment.

Herein, a method of manufacturing the electrode sheet (positive electrode sheet 19) according to this embodiment will be described in detail. FIG. 1 is a schematic diagram of a first roll film forming apparatus 20 according to the embodiment. FIG. 2 is a perspective view of the first roll film forming apparatus 20. FIG. 3 is a flowchart showing the flow of the method of manufacturing the electrode sheet (positive electrode sheet 19) according to the embodiment. FIG. 4 is a schematic diagram of the first roll film forming apparatus 20 and a first drying apparatus 50 according to the embodiment. FIG. 5 is a schematic diagram of a second roll film forming apparatus 30 according to the embodiment. FIG. 6 is a perspective view of the second roll film forming apparatus 30. FIG. 7 is a schematic diagram of the second roll film forming apparatus 30 and a second drying apparatus 70 according to the embodiment. FIG. 8 is a schematic diagram of a press apparatus 60 according to the embodiment.

As shown in FIG. 3, first, at step S1 (electrode mixture producing process), the large number of wet granules 16 are produced by mixing and granulating the positive electrode active material ($LiNi_{1/3}Mn_{1/3}Co_{1/3}O_2$), the conductive material (acetylene black), the binder (PVdF), and the solvent (NMP), so that the positive electrode mixture 6 containing the large number of wet granules 16 is produced. In this embodiment, the positive electrode active material, the conductive material, the binder, and the solvent are put into a known stirring granulator (not shown) and stirred so that the materials are mixed (dispersed) and granulated into the large number of wet granules 16. In this way, the positive electrode mixture 6 containing the large number of wet granules 16 is obtained.

The wet granules 16 are each a substance (granular body) in which NMP as the solvent and particles of the positive electrode active material are collected (joined) together in the state where NMP and the particles of the positive electrode active material are held (absorbed) by the binder. The positive electrode mixture 6 is an aggregate of the wet granules 16 described above.

Then, at step S2 (first film forming process), the positive electrode mixture 6 produced at step S1 (electrode mixture producing process) is formed into a film shape, and the film-shaped positive electrode mixture 6 is adhered to the first surface 7b of the collector foil 7, thereby producing the first positive electrode mixture layer coated collector foil 41 (first electrode mixture layer coated collector foil) in which the first positive electrode mixture layer 18b (first electrode mixture layer) is formed on the first surface 7b of the collector foil 7. In this embodiment, step S2 (first film forming process) is performed using the first roll film forming apparatus 20 shown in FIGS. 1 and 2.

As shown in FIGS. 1 and 2, the first roll film forming apparatus 20 includes three rolls, i.e. a first roll 1, a second roll 2, and a third roll 3. The first roll 1 and the second roll 2 are disposed side by side in the horizontal direction (right-left direction in FIG. 1). On the other hand, the second roll 2 and the third roll 3 are disposed side by side in the vertical direction (up-down direction in FIG. 1). The first roll 1 and the second roll 2 face (confront) each other with a slight interval therebetween. Likewise, the second roll 2 and the third roll 3 face (confront) each other with a slight interval therebetween. Further, on the upper side of the facing portion between the first roll 1 and the second roll 2, partition plates 4, 5 are disposed to be spaced apart from each other in the width direction of the roll (axial direction of the roll, i.e. a direction perpendicular to the sheet surface in FIG. 1).

The rotational directions of the three rolls 1 to 3 are set such that, as indicated by arrows in FIGS. 1 and 2, the rotational directions of the adjacent (facing) two rolls are opposite to each other, i.e. the facing two rolls rotate in the forward direction relative to each other. At the facing portion between the first roll 1 and the second roll 2, the surfaces of these rolls are configured to move downward by the rotation. At the facing portion between the second roll 2 and the third roll 3, the surfaces of these rolls are configured to move rightward by the rotation. Regarding the rotational speed, the moving speed of the surface of the roll by the rotation is set to be the lowest at the first roll 1, the highest at the third roll 3, and between them at the second roll 2.

In the first roll film forming apparatus 20 thus configured, the positive electrode mixture 6 produced at step S1 (electrode mixture producing process) is put into an accommodation space between the partition plates 4, 5 located above the facing portion between the first roll 1 and the second roll 2. The collector foil 7 is wound on the third roll 3. At step S2 (first film forming process), the collector foil 7 is wound on the third roll 3 such that the second surface 7c of the collector foil 7 is brought in contact with the surface of the third roll 3 (in other words, the first surface 7b of the collector foil 7 faces radially outward of the third roll 3).

The collector foil 7 is a metal foil (aluminum foil) having the first surface 7b (front surface) and the second surface 7c (back surface). With the rotation of the third roll 3, the collector foil 7 passes through the facing portion (gap) between the second roll 2 and the third roll 3 so as to be conveyed from the lower right to the upper right of the third roll 3. In the state where the collector foil 7 passes through the facing portion (gap) between the second roll 2 and the third roll 3, a slight gap is provided between the second roll 2 and the collector foil 7. That is, the gap between the second roll 2 and the third roll 3 (gap in the state where the collector foil 7 is not present) is slightly greater than the thickness of the collector foil 7.

At step S2 (first film forming process), while the positive electrode mixture 6 is formed into a film shape by passing the positive electrode mixture 6 through the gap between the first roll 1 and the second roll 2 facing each other and rotating, the film-shaped positive electrode mixture 6 is adhered to the surface of the second roll 2. At the same time, while the second surface 7c of the collector foil 7 conveyed by the third roll 3 facing the second roll 2 and rotating is brought in contact with the surface of the third roll 3, the collector foil 7 is passed through the gap between the second roll 2 and the third roll 3. Consequently, the film-shaped positive electrode mixture 6 adhering to the surface of the second roll 2 is pressed against the first surface 7b of the collector foil 7 so as to be transferred to the first surface 7b. When passing through the gap between the second roll 2 and the third roll 3 (i.e. when transferred to the first surface 7b of the collector foil 7), the film-shaped positive electrode mixture 6 is compressed in its thickness direction so that its density is increased.

More specifically, first, the positive electrode mixture 6 produced at step Si (electrode mixture producing process) is put into the accommodation space between the partition plates 4, 5 of the first roll film forming apparatus 20. The input positive electrode mixture 6 is supplied into the gap at the facing portion between the first roll 1 and the second roll 2 facing each other and rotating and is, by the rotation of the first roll 1 and the second roll 2, passed through the gap between the first and second rolls 1, 2 so as to be formed into a film shape (see FIGS. 1 and 2). In this event, since the rotational speed of the second roll 2 is higher than the rotational speed of the first roll 1, the positive electrode mixture 6 (wet granules 16) is stretched more on the surface of the second roll 2 than on the surface of the first roll 1, and therefore, the liquid bridge area becomes greater on the surface of the second roll 2 than on the surface of the first roll 1 so that the positive electrode mixture 6 is carried (adhered) on the surface of the second roll 2.

Then, the film-shaped positive electrode mixture 6 carried (adhered) on the surface of the second roll 2 (hereinafter referred to as a "first film-shaped positive electrode mixture 8") is conveyed with the rotation of the second roll 2 (see FIGS. 1 and 2). Then, the first surface 7b of the collector foil 7 and the first film-shaped positive electrode mixture 8 meet each other at the facing portion between the second roll 2 and the third roll 3 so that the collector foil 7 and the first film-shaped positive electrode mixture 8 are sandwiched between the second roll 2 and the third roll 3. The gap dimension (minimum gap dimension) at the facing portion between the second roll 2 and the third roll 3 is set to be smaller than the sum of the thickness of the collector foil 7 and the thickness of the first film-shaped positive electrode mixture 8.

Therefore, when the collector foil 7 and the first film-shaped positive electrode mixture 8 are sandwiched between the second roll 2 and the third roll 3, the pressing load is applied to the first film-shaped positive electrode mixture 8 from the surface of the second roll 2 toward the first surface 7b of the collector foil 7. Consequently, the first film-shaped positive electrode mixture 8 adhering to the surface of the second roll 2 is pressed against the first surface 7b of the collector foil 7 so that the first film-shaped positive electrode mixture 8 is transferred (adhered) from the second roll 2 to the first surface 7b of the collector foil 7 that is moving with the rotation of the third roll 3. In this event, the first film-shaped positive electrode mixture 8 is compressed in its thickness direction so as to be the first positive electrode mixture layer 18b, thereby obtaining the first positive electrode mixture layer coated collector foil 41 (first electrode mixture layer coated collector foil) in which the first positive electrode mixture layer 18b is formed on the first surface 7b of the collector foil 7.

Then, at step S3 (first drying process), the first positive electrode mixture layer coated collector foil 41 (first positive electrode mixture layer 18b) is dried. Specifically, as shown in FIG. 4, the first positive electrode mixture layer 18b formed on the first surface 7b of the collector foil 7 is dried by passing the first positive electrode mixture layer coated collector foil 41 through the inside of the first drying apparatus 50 (drying furnace). Consequently, the solvent absorbed (retained) in the first positive electrode mixture layer 18b (wet granules 16) is removed (evaporated).

Then, at step S4 (second film forming process), the positive electrode mixture 6 is adhered (coated) in a film shape on the second surface 7c of the first positive electrode mixture layer coated collector foil 41, thereby producing the positive electrode sheet 19 (electrode sheet) in which the second positive electrode mixture layer 18c (second electrode mixture layer) is formed on the second surface 7c of the collector foil 7. In this embodiment, step S4 (second film forming process) is performed using the second roll film forming apparatus 30 shown in FIGS. 5 and 6. Details will be described below.

As shown in FIGS. 5 and 6, the second roll film forming apparatus 30 includes three rolls, i.e. a fourth roll 31, a fifth roll 32, and a sixth roll 33. The fourth roll 31 and the fifth roll 32 are disposed side by side in the horizontal direction (right-left direction in FIG. 5). On the other hand, the fifth roll 32 and the sixth roll 33 are disposed side by side in the vertical direction (up-down direction in FIG. 5). The fourth roll 31 and the fifth roll 32 face (confront) each other with a slight interval therebetween. Likewise, the fifth roll 32 and the sixth roll 33 face (confront) each other with a slight interval therebetween. Further, on the upper side of the facing portion between the fourth roll 31 and the fifth roll 32, partition plates 4, 5 are disposed to be spaced apart from each other in the width direction of the roll (axial direction of the roll, i.e. a direction perpendicular to the sheet surface in FIG. 5).

The second roll film forming apparatus 30 differs from the first roll film forming apparatus 20 in that the gap dimension at the facing portion between the fifth roll 32 and the sixth roll 33 is slightly greater than the gap dimension at the facing portion between the second roll 2 and the third roll 3. The other configuration is the same as the first roll film forming apparatus 20. Therefore, the fourth roll 31 is equivalent to the first roll 1, the fifth roll 32 is equivalent to the second roll 2, and the sixth roll 33 is equivalent to the third roll 3.

In the second roll film forming apparatus 30 thus configured, the positive electrode mixture 6 produced at step S1 (electrode mixture producing process) is put into an accommodation space between the partition plates 4, 5. The first positive electrode mixture layer coated collector foil 41 treated at step S3 (first drying process) is wound on the sixth roll 33. Specifically, the first positive electrode mixture layer coated collector foil 41 is wound on the sixth roll 33 such that the first positive electrode mixture layer 18b of the first positive electrode mixture layer coated collector foil 41 is brought in contact with the surface of the sixth roll 33 (in other words, the second surface 7c of the collector foil 7 faces radially outward of the sixth roll 33).

With the rotation of the sixth roll 33, the first positive electrode mixture layer coated collector foil 41 passes through the facing portion (gap) between the fifth roll 32 and the sixth roll 33 so as to be conveyed from the lower right to the upper right of the sixth roll 33. In the state where the first positive electrode mixture layer coated collector foil 41 passes through the facing portion (gap) between the fifth roll 32 and the sixth roll 33, a slight gap is provided between the fifth roll 32 and the first positive electrode mixture layer coated collector foil 41. That is, the gap between the fifth roll 32 and the sixth roll 33 (gap in the state where the first positive electrode mixture layer coated collector foil 41 is not present) is slightly greater than the thickness of the first positive electrode mixture layer coated collector foil 41.

At step S4 (second film forming process), while the positive electrode mixture 6 is formed into a film shape by passing the positive electrode mixture 6 through the gap between the fourth roll 31 and the fifth roll 32 facing each other and rotating, the film-shaped positive electrode mixture 6 is adhered to the surface of the fifth roll 32. At the same time, while the first positive electrode mixture layer 18b of the first positive electrode mixture layer coated collector foil 41 conveyed by the sixth roll 33 facing the fifth roll 32 and rotating is brought in contact with the surface of the sixth roll 33, the first positive electrode mixture layer coated collector foil 41 is passed through the gap between the fifth roll 32 and the sixth roll 33. Consequently, the film-shaped positive electrode mixture 6 adhering to the surface of the fifth roll 32 is pressed against the second surface 7c of the first positive electrode mixture layer coated collector foil 41 so as to be transferred to the second surface 7c. When passing through the gap between the fifth roll 32 and the sixth roll 33 (i.e. when transferred to the second surface 7c of the collector foil 7), the film-shaped electrode mixture 6 is compressed in its thickness direction so that its density is increased.

More specifically, first, the positive electrode mixture 6 produced at step S1 (electrode mixture producing process) is put into the accommodation space between the partition plates 4, 5 of the second roll film forming apparatus 30. The input positive electrode mixture 6 is supplied into the gap at the facing portion between the fourth roll 31 and the fifth roll 32 facing each other and rotating and is, by the rotation of the fourth roll 31 and the fifth roll 32, passed through the gap between the fourth and fifth rolls 31, 32 so as to be formed into a film shape and carried (adhered) on the surface of the fifth roll 32 (see FIGS. 5 and 6).

Then, the film-shaped positive electrode mixture 6 carried (adhered) on the surface of the fifth roll 32 (hereinafter referred to as a "second film-shaped positive electrode mixture 48") is conveyed with the rotation of the fifth roll 32 (see FIGS. 5 and 6). Then, the second surface 7c of the first positive electrode mixture layer coated collector foil 41 and the second film-shaped positive electrode mixture 48 meet each other at the facing portion between the fifth roll 32 and the sixth roll 33 so that the first positive electrode mixture layer coated collector foil 41 and the second film-shaped positive electrode mixture 48 are sandwiched between the fifth roll 32 and the sixth roll 33. The gap dimension (minimum gap dimension) at the facing portion between the fifth roll 32 and the sixth roll 33 is set to be smaller than the sum of the thickness of the first positive electrode mixture layer coated collector foil 41 and the thickness of the second film-shaped positive electrode mixture 48.

Therefore, when the first positive electrode mixture layer coated collector foil 41 and the second film-shaped positive electrode mixture 48 are sandwiched between the fifth roll 32 and the sixth roll 33, the pressing load is applied to the second film-shaped positive electrode mixture 48 from the surface of the fifth roll 32 toward the second surface 7c of the first positive electrode mixture layer coated collector foil 41. Consequently, the second film-shaped positive electrode mixture 48 adhering to the surface of the fifth roll 32 is pressed against the second surface 7c of the first positive electrode mixture layer coated collector foil 41 so that the second film-shaped positive electrode mixture 48 is transferred (adhered) from the fifth roll 32 to the second surface 7c of the first positive electrode mixture layer coated collector foil 41 that is moving with the rotation of the sixth roll 33. In this event, the second film-shaped positive electrode mixture 48 is compressed in its thickness direction so as to be the second positive electrode mixture layer 18c so that the second positive electrode mixture layer 18c is formed on the second surface 7c of the collector foil 7, thereby obtaining the positive electrode sheet 19.

Then, at step S5 (second drying process), the positive electrode sheet 19 (second positive electrode mixture layer 18c) is dried. Specifically, as shown in FIG. 7, the second positive electrode mixture layer 18c formed on the second surface 7c of the collector foil 7 is dried by passing the positive electrode sheet 19 through the inside of the second drying apparatus 70 (drying furnace). Consequently, the solvent absorbed (retained) in the second positive electrode mixture layer 18c (wet granules 16) is removed (evaporated).

In the meantime, in the positive electrode sheet 19 produced as described above, there are cases where the density of the first positive electrode mixture layer 18b formed on the first surface 7b of the collector foil 7 becomes higher than the density of the second positive electrode mixture layer 18c formed on the second surface 7c of the collector foil 7 so that the large density difference occurs between the first and second electrode mixture layers 18b, 18c. This is because since the first positive electrode mixture layer 18b is formed by compression of the positive electrode mixture 6 between the second roll 2 and the third roll 3 in the first film forming process (step S2) and is further compressed between the fifth roll 32 and the sixth roll 33 when the second positive electrode mixture layer 18c is formed in the second film forming process (step S4), the compressibility of the first positive electrode mixture layer 18b becomes higher (the porosity of the first positive electrode mixture layer 18b becomes lower) than that of the second positive electrode mixture layer 18c. Therefore, in the positive electrode sheet 19 produced as described above, there is a tendency that the density of the first positive electrode mixture layer 18b becomes higher than the density of the second positive electrode mixture layer 18c.

In this regard, the manufacturing method of this embodiment includes step S6 (roll pressing process) in which, after step S5 (second drying process), the first positive electrode mixture layer 18b and the second positive electrode mixture layer 18c are compressed in the thickness direction thereof by passing the positive electrode sheet 19 through a gap between a seventh roll 61 and an eighth roll 62 facing each other and rotating (see FIG. 3).

Specifically, at step S6 (roll pressing process), the first positive electrode mixture layer 18b and the second positive electrode mixture layer 18c of the positive electrode sheet 19 are compressed using the press apparatus 60 having a pair of rolls (seventh roll 61 and eighth roll 62) (see FIG. 8). The gap dimension (minimum gap dimension) at the facing portion between the seventh roll 61 and the eighth roll 62 is set to be smaller than the thickness of the positive electrode sheet 19 produced at step S5 (second drying process).

As shown in FIG. 8, the press apparatus 60 of this embodiment includes the seventh roll 61, the eighth roll 62, a first temperature sensor 141 for measuring a temperature T7 of the surface of the seventh roll 61 (the surface contacting the first positive electrode mixture layer 18*b*), and a second temperature sensor 142 for measuring a temperature T8 of the surface of the eighth roll 62 (the surface contacting the second positive electrode mixture layer 18*c*). The press apparatus 60 further includes a first chiller 110 for maintaining the temperature T7 of the surface of the seventh roll 61 (the surface contacting the first positive electrode mixture layer 18*b*) at a first temperature, a second chiller 120 for maintaining the temperature T8 of the surface of the eighth roll 62 (the surface contacting the second positive electrode mixture layer 18*c*) at a second temperature (higher than the first temperature), and a heater 130 for heating the surface of the eighth roll 62.

The first chiller 110 includes a circulation path 112 in which a heat medium is circulated, and a first body portion 111 that controls the temperature of the heat medium. Based on the surface temperature T7 of the seventh roll 61 measured by the first temperature sensor 141, the first body portion 111 adjusts the temperature of the heat medium circulating in the circulation path 112 so that the surface temperature T7 of the seventh roll 61 is maintained at the first temperature. Consequently, in the press apparatus 60 of this embodiment, the surface temperature T7 of the seventh roll 61 can be maintained at the first temperature.

The second chiller 120 includes a circulation path 122 in which a heat medium is circulated, and a second body portion 121 that controls the temperature of the heat medium. Based on the surface temperature T8 of the eighth roll 62 measured by the second temperature sensor 142, the second body portion 121 adjusts the temperature of the heat medium circulating in the circulation path 122 so that the surface temperature T8 of the eighth roll 62 is maintained at the second temperature. The heater 130 is an IH heater and includes heat generating portions 132, 133 and a controller 131. Based on the surface temperature T8 of the eighth roll 62 measured by the second temperature sensor 142, the controller 131 adjusts the calorific values in the heat generating portions 132, 133 so that the surface temperature T8 of the eighth roll 62 is maintained at the second temperature.

Consequently, in the press apparatus 60 of this embodiment, the surface temperature T8 of the eighth roll 62 can be maintained at the second temperature higher than the first temperature.

Using the press apparatus 60 thus configured, in the roll pressing process (step S6) of this embodiment, the first positive electrode mixture layer 18*b* and the second positive electrode mixture layer 18*c* of the positive electrode sheet 19 are compressed so that the surface temperature T7 of the seventh roll 61 disposed on the first positive electrode mixture layer 18*b* side and contacting the first positive electrode mixture layer 18*b* and the surface temperature T8 of the eighth roll 62 disposed on the second positive electrode mixture layer 18*c* side and contacting the second positive electrode mixture layer 18*c* satisfy a relationship of T7<T8.

In this way, by setting the surface temperature T8 of the eighth roll 62 brought in contact with the second positive electrode mixture layer 18*c* having the relatively low density to be higher than the surface temperature T7 of the seventh roll 61 brought in contact with the first positive electrode mixture layer 18*b* having the relatively high density, the compression can be performed while the temperature of the second positive electrode mixture layer 18*c* is made higher than the temperature of the first positive electrode mixture layer 18*b*. Consequently, in the roll pressing process (step S6), the compression can be performed while the second positive electrode mixture layer 18*c* is made softer than the first positive electrode mixture layer 18*b*, and accordingly, the second positive electrode mixture layer 18*c* is compressed more easily than the first positive electrode mixture layer 18*b*. As a result, in the positive electrode sheet 19 after performing the roll pressing process (step S6), the density difference between the first positive electrode mixture layer 18*b* and the second positive electrode mixture layer 18*c* is reduced compared to the positive electrode sheet 19 before performing the roll pressing process.

Specifically, in the roll pressing process (step S6) of this embodiment, the surface temperature T7 of the seventh roll 61 is maintained at a temperature lower than (Ts-50)° C. being a temperature 50° C. lower than a softening temperature Ts of the binder contained in the positive electrode mixture 6. On the other hand, the surface temperature T8 of the eighth roll 62 is maintained at a temperature equal to or higher than (Ts-50)° C. That is, the roll pressing process is performed in the state where the surface temperature T7 of the seventh roll 61 brought in contact with the first positive electrode mixture layer 18*b* having the relatively high density is maintained at the first temperature lower than (Ts-50)° C., and the surface temperature T8 of the eighth roll 62 brought in contact with the second positive electrode mixture layer 18*c* having the relatively low density is maintained at the second temperature equal to or higher than (Ts-50)° C.

By maintaining the surface temperature T8 of the eighth roll 62 brought in contact with the second positive electrode mixture layer 18*c* at the second temperature equal to or higher than (Ts-50)° C., it is possible to soften the binder contained in the second positive electrode mixture layer 18*c* so that the compressibility of the second positive electrode mixture layer 18*c* can be increased. On the other hand, by maintaining the surface temperature T7 of the seventh roll 61 brought in contact with the first positive electrode mixture layer 18*b* at the first temperature lower than (Ts-50)° C., it is possible to suppress softening of the binder contained in the first positive electrode mixture layer 18*b* so that the compressibility of the first positive electrode mixture layer 18*b* by the roll pressing process can be made lower than the compressibility of the second positive electrode mixture layer 18*c* by the roll pressing process. As a result, in the positive electrode sheet 19 after performing the roll pressing process (step S6), the density difference between the first positive electrode mixture layer 18*b* and the second positive electrode mixture layer 18*c* is reduced compared to the positive electrode sheet 19 before performing the roll pressing process.

In this embodiment, polyvinylidene difluoride (PVdF) is used as the binder. The softening temperature Ts of PVdF is 150° C. Therefore, in the roll pressing process (step S6) of this embodiment, temperature adjustment is performed by the first chiller 110 so that the surface temperature T7 of the seventh roll 61 is maintained at the first temperature lower than (Ts-50)=150-50=100° C., and temperature adjustment is performed by the second chiller 120 and the heater 130 so that the surface temperature T8 of the eighth roll 62 is maintained at the second temperature equal to or higher than (Ts-50)=100° C.

More specifically, in the roll pressing process (step S6) of this embodiment, the surface temperature T7 of the seventh roll 61 is maintained at a temperature in a range from 15° C. to 35° C. (i.e. normal temperature) by the first chiller 110. In this way, by maintaining the surface temperature T7 of the seventh roll 61 brought in contact with the first positive electrode mixture layer 18b at the temperature in the range from 15° C. to 35° C., it is possible to suppress softening of the binder (PVdF) contained in the first positive electrode mixture layer 18b at the time of roll pressing so that the compressibility of the first positive electrode mixture layer 18b by the roll pressing process (step S6) can be made lower than the compressibility of the second positive electrode mixture layer 18c by the roll pressing process (step S6). Consequently, in the positive electrode sheet 19 after performing the roll pressing process (step S6), the density difference between the first positive electrode mixture layer 18b and the second positive electrode mixture layer 18c can be reduced compared to the positive electrode sheet 19 before performing the roll pressing process.

The positive electrode sheet 19 produced as described above can be used, for example, as a positive electrode sheet of a lithium-ion secondary battery. Specifically, for example, the positive electrode sheet 19 is combined with a negative electrode sheet and a separator and forms an electrode body. Then, terminal members are attached to the electrode body, and then the electrode body and an electrolyte solution are housed in a battery case. In this way, the lithium-ion secondary battery is completed.

EXAMPLES 1 TO 7 AND COMPARATIVE EXAMPLE 1

In Examples 1 to 7 and Comparative Example 1, the positive electrode sheets 19 were produced by changing the surface temperature T7 of the seventh roll 61 and the surface temperature T8 of the eighth roll 62 at step S6 (roll pressing process). The other configurations were the same as each other.

Specifically, in Example 1, at step S6 (roll pressing process), the first positive electrode mixture layer 18b and the second positive electrode mixture layer 18c of the positive electrode sheet 19 were compressed while maintaining the surface temperature T7 of the seventh roll 61 at 25° C. and maintaining the surface temperature T8 of the eighth roll 62 at 100° C. In Example 2, at step S6 (roll pressing process), the first positive electrode mixture layer 18b and the second positive electrode mixture layer 18c of the positive electrode sheet 19 were compressed while maintaining the surface temperature T7 of the seventh roll 61 at 25° C. and maintaining the surface temperature T8 of the eighth roll 62 at 150° C.

In Example 3, at step S6 (roll pressing process), the first positive electrode mixture layer 18b and the second positive electrode mixture layer 18c of the positive electrode sheet 19 were compressed while maintaining the surface temperature T7 of the seventh roll 61 at 25° C. and maintaining the surface temperature T8 of the eighth roll 62 at 200° C. In Example 4, at step S6 (roll pressing process), the first positive electrode mixture layer 18b and the second positive electrode mixture layer 18c of the positive electrode sheet 19 were compressed while maintaining the surface temperature T7 of the seventh roll 61 at 35° C. and maintaining the surface temperature T8 of the eighth roll 62 at 200° C.

In Example 5, at step S6 (roll pressing process), the first positive electrode mixture layer 18b and the second positive electrode mixture layer 18c of the positive electrode sheet 19 were compressed while maintaining the surface temperature T7 of the seventh roll 61 at 15° C. and maintaining the surface temperature T8 of the eighth roll 62 at 200° C. In Example 6, at step S6 (roll pressing process), the first positive electrode mixture layer 18b and the second positive electrode mixture layer 18c of the positive electrode sheet 19 were compressed while maintaining the surface temperature T7 of the seventh roll 61 at 35° C. and maintaining the surface temperature T8 of the eighth roll 62 at 100° C.

In Example 7, at step S6 (roll pressing process), the first positive electrode mixture layer 18b and the second positive electrode mixture layer 18c of the positive electrode sheet 19 were compressed while maintaining the surface temperature T7 of the seventh roll 61 at 15° C. and maintaining the surface temperature T8 of the eighth roll 62 at 100° C. In Comparative Example 1, at step S6 (roll pressing process), the first positive electrode mixture layer 18b and the second positive electrode mixture layer 18c of the positive electrode sheet 19 were compressed while maintaining the surface temperature T7 of the seventh roll 61 at 25° C. and maintaining the surface temperature T8 of the eighth roll 62 also at 25° C.

Thereafter, the density difference (g/cc) between the first positive electrode mixture layer 18b and the second positive electrode mixture layer 18c was examined for the positive electrode sheet 19 of each of Examples 1 to 7 and Comparative Example 1. The results are shown in Table 1. In each of Examples 1 to 7 and Comparative Example 1, in the positive electrode sheet 19 before performing the processing of step S6 (roll pressing process), the density of the first positive electrode mixture layer 18b was higher than the density of the second positive electrode mixture layer 18c, and the density difference (g/cc) between the first positive electrode mixture layer 18b and the second positive electrode mixture layer 18c was 0.85 (g/cc). In each of Examples 1 to 7 and Comparative Example 1, the processing of step S6 (roll pressing process) was performed using the seventh roll 61 and the eighth roll 62 having a diameter of 390 mm.

TABLE 1

| | Surface Temperature T7 of Seventh Roll (° C.) | Surface Temperature T8 of Eighth Roll (° C.) | Density Difference (g/cc) |
|---|---|---|---|
| Comparative Example 1 | 25 | 25 | 0.7 |
| Example 1 | 25 | 100 | 0.08 |
| Example 2 | 25 | 150 | 0.05 |
| Example 3 | 25 | 200 | 0.09 |
| Example 4 | 35 | 200 | 0.07 |
| Example 5 | 15 | 200 | 0.07 |
| Example 6 | 35 | 100 | 0.08 |
| Example 7 | 15 | 100 | 0.07 |

As shown in Table 1, in the positive electrode sheet of Comparative Example 1, the density difference between the first positive electrode mixture layer 18b and the second positive electrode mixture layer 18c was 0.7 (g/cc). On the other hand, in the positive electrode sheet 19 of each of Examples 1 to 7, the density difference between the first positive electrode mixture layer 18b and the second positive electrode mixture layer 18c was equal to or less than 0.09 (g/cc).

As described above, in Comparative Example 1, the processing of step S6 (roll pressing process) was performed by setting the surface temperature T7 of the seventh roll 61 and the surface temperature T8 of the eighth roll 62 to the same temperature (specifically, 25° C.). On the other hand, in each of Examples 1 to 7, the processing of step S6 (roll pressing process) was performed by setting the surface temperature T8 of the eighth roll 62 to be higher than the surface temperature T7 of the seventh roll 61 (satisfying the relationship of T7<T8).

From these results, it can be said that when the processing of step S6 (roll pressing process) is performed by setting the surface temperature T8 of the eighth roll 62 to be higher than the surface temperature T7 of the seventh roll 61 (satisfying the relationship of T7<T8), it is possible to reduce the density difference between the first positive electrode mixture layer 18b and the second positive electrode mixture layer 18c compared to the case where T7=T8. The reason can be considered as follows.

Specifically, by setting the surface temperature T8 of the eighth roll 62 brought in contact with the second positive electrode mixture layer 18c having the relatively low density to be higher than the surface temperature T7 of the seventh roll 61 brought in contact with the first positive electrode mixture layer 18b having the relatively high density, the compression can be performed while the temperature of the second positive electrode mixture layer 18c is made higher than the temperature of the first positive electrode mixture layer 18b. Consequently, in the roll pressing process (step S6), the compression can be performed while the second positive electrode mixture layer 18c is made softer than the first positive electrode mixture layer 18b, and therefore, the second positive electrode mixture layer 18c is compressed more easily than the first positive electrode mixture layer 18b.

In particular, in each of Examples 1 to 7, the surface temperature T7 of the seventh roll 61 was maintained at the temperature lower than (Ts-50)=100° C. being the temperature 50° C. lower than the softening temperature Ts (=150° C.) of the binder (PVdF) contained in the positive electrode mixture 6. On the other hand, the surface temperature T8 of the eighth roll 62 was maintained at the temperature equal to or higher than (Ts-50)=100° C. That is, the roll pressing process was performed in the state where the surface temperature T7 of the seventh roll 61 brought in contact with the first positive electrode mixture layer 18b having the relatively high density was maintained at the first temperature lower than (Ts-50)° C., and the surface temperature T8 of the eighth roll 62 brought in contact with the second positive electrode mixture layer 18c having the relatively low density was maintained at the second temperature equal to or higher than (Ts-50)° C.

In this way, by maintaining the surface temperature T8 of the eighth roll 62 brought in contact with the second positive electrode mixture layer 18c at the second temperature equal to or higher than (Ts-50)° C., it is possible to soften the binder contained in the second positive electrode mixture layer 18c so that the compressibility of the second positive electrode mixture layer 18c can be increased. On the other hand, by maintaining the surface temperature T7 of the seventh roll 61 brought in contact with the first positive electrode mixture layer 18b at the first temperature lower than (Ts-50)° C., it is possible to suppress softening of the binder contained in the first positive electrode mixture layer 18b so that the compressibility of the first positive electrode mixture layer 18b by the roll pressing process can be made lower than the compressibility of the second positive electrode mixture layer 18c by the roll pressing process.

More specifically, in each of Examples 1 to 7, the surface temperature T7 of the seventh roll 61 was maintained at the temperature in the range from 15° C. to 35° C. (i.e. normal temperature). In this way, by maintaining the surface temperature T7 of the seventh roll 61 brought in contact with the first positive electrode mixture layer 18b at the temperature in the range from 15° C. to 35° C., it is possible to suppress softening of the binder (PVdF) contained in the first positive electrode mixture layer 18b at the time of roll pressing so that the compressibility of the first positive electrode mixture layer 18b by the roll pressing process (step S6) can be made sufficiently lower than the compressibility of the second positive electrode mixture layer 18c by the roll pressing process (step S6). In other words, the compressibility of the second positive electrode mixture layer 18c by the roll pressing process (step S6) can be made sufficiently higher than the compressibility of the first positive electrode mixture layer 18b by the roll pressing process (step S6). Accordingly, it can be concluded that, in each of Examples 1 to 7, the density difference between the first positive electrode mixture layer 18b and the second positive electrode mixture layer 18c in the positive electrode sheet 19 was made extremely small by performing the roll pressing process (step S6).

EXAMPLES 8 TO 10 AND COMPARATIVE EXAMPLE 2

In Examples 8 to 10 and Comparative Example 2, the positive electrode sheets 19 were produced by changing the surface temperature T7 of the seventh roll 61 and the surface temperature T8 of the eighth roll 62 at step S6 (roll pressing process). The other configurations were the same as each other. Differently from Examples 1 to 7 and Comparative Example 1, in each of Examples 8 to 10 and Comparative Example 2, the processing of step S6 (roll pressing process) was performed using the seventh roll 61 and the eighth roll 62 having a diameter of 150 mm.

Specifically, in Example 8, at step S6 (roll pressing process), the first positive electrode mixture layer 18b and the second positive electrode mixture layer 18c of the positive electrode sheet 19 were compressed while maintaining the surface temperature T7 of the seventh roll 61 at 25° C. and maintaining the surface temperature T8 of the eighth roll 62 at 100° C. In Example 9, at step S6 (roll pressing process), the first positive electrode mixture layer 18b and the second positive electrode mixture layer 18c of the positive electrode sheet 19 were compressed while maintaining the surface temperature T7 of the seventh roll 61 at 25° C. and maintaining the surface temperature T8 of the eighth roll 62 at 150° C.

In Example 10, at step S6 (roll pressing process), the first positive electrode mixture layer 18b and the second positive electrode mixture layer 18c of the positive electrode sheet 19 were compressed while maintaining the surface temperature T7 of the seventh roll 61 at 25° C. and maintaining the surface temperature T8 of the eighth roll 62 at 200° C. In Comparative Example 2, at step S6 (roll pressing process), the first positive electrode mixture layer 18b and the second positive electrode mixture layer 18c of the positive electrode sheet 19 were compressed while maintaining the surface temperature T7 of the seventh roll 61 at 25° C. and maintaining the surface temperature T8 of the eighth roll 62 also at 25° C.

Thereafter, the density difference (g/cc) between the first positive electrode mixture layer 18b and the second positive electrode mixture layer 18c was examined for the positive electrode sheet 19 of each of Examples 8 to 10 and Comparative Example 2. The results are shown in Table 2. In each of Examples 8 to 10 and Comparative Example 2, in the positive electrode sheet 19 before performing the processing of step S6 (roll pressing process), the density of the first positive electrode mixture layer 18b was higher than the density of the second positive electrode mixture layer 18c, and the density difference (g/cc) between the first positive electrode mixture layer 18b and the second positive electrode mixture layer 18c was 0.85 (g/cc).

TABLE 2

| | Surface Temperature T7 of Seventh Roll (° C.) | Surface Temperature T8 of Eighth Roll (° C.) | Density Difference (g/cc) |
|---|---|---|---|
| Comparative Example 2 | 25 | 25 | 0.68 |
| Example 8 | 25 | 100 | 0.65 |
| Example 9 | 25 | 150 | 0.62 |
| Example 10 | 25 | 200 | 0.57 |

As shown in Table 2, in the positive electrode sheet of Comparative Example 2, the density difference between the first positive electrode mixture layer 18b and the second positive electrode mixture layer 18c was 0.68 (g/cc). On the other hand, in the positive electrode sheet 19 of each of Examples 8 to 10, the density difference between the first positive electrode mixture layer 18b and the second positive electrode mixture layer 18c was equal to or less than 0.65 (g/cc) and thus was smaller than that of Comparative Example 2.

As described above, in Comparative Example 2, the processing of step S6 (roll pressing process) was performed by setting the surface temperature T7 of the seventh roll 61 and the surface temperature T8 of the eighth roll 62 to the same temperature (specifically, 25° C.). On the other hand, in each of Examples 8 to 10, the processing of step S6 (roll pressing process) was performed by setting the surface temperature T8 of the eighth roll 62 to be higher than the surface temperature T7 of the seventh roll 61 (satisfying the relationship of T7<T8).

Also from these results, it can be said that when the processing of step S6 (roll pressing process) is performed by setting the surface temperature T8 of the eighth roll 62 to be higher than the surface temperature T7 of the seventh roll 61 (satisfying the relationship of T7<T8), it is possible to reduce the density difference between the first positive electrode mixture layer 18b and the second positive electrode mixture layer 18c compared to the case where T7=T8. Further, it can be said that the surface temperature T7 of the seventh roll 61 is preferably set to be lower than (Ts-50)° C. being the temperature 50° C. lower than the softening temperature Ts of the binder (PVdF) contained in the positive electrode mixture 6, while the surface temperature T8 of the eighth roll 62 is preferably set to be equal to or higher than (Ts-50)° C. More specifically, it can be said that the surface temperature T7 of the seventh roll 61 is preferably set to the temperature in the range from 15° C. to 35° C.

EXAMPLES 11 TO 13 AND COMPARATIVE EXAMPLE 3

In Examples 11 to 13 and Comparative Example 3, the positive electrode sheets 19 were produced by changing the surface temperature T7 of the seventh roll 61 and the surface temperature T8 of the eighth roll 62 at step S6 (roll pressing process). The other configurations were the same as each other. Differently from Examples 1 to 7 and Comparative Example 1, in each of Examples 11 to 13 and Comparative Example 3, the processing of step S6 (roll pressing process) was performed using the seventh roll 61 and the eighth roll 62 having a diameter of 300 mm.

Specifically, in Example 11, at step S6 (roll pressing process), the first positive electrode mixture layer 18b and the second positive electrode mixture layer 18c of the positive electrode sheet 19 were compressed while maintaining the surface temperature T7 of the seventh roll 61 at 25° C. and maintaining the surface temperature T8 of the eighth roll 62 at 100° C. In Example 12, at step S6 (roll pressing process), the first positive electrode mixture layer 18b and the second positive electrode mixture layer 18c of the positive electrode sheet 19 were compressed while maintaining the surface temperature T7 of the seventh roll 61 at 25° C. and maintaining the surface temperature T8 of the eighth roll 62 at 150° C.

In Example 13, at step S6 (roll pressing process), the first positive electrode mixture layer 18b and the second positive electrode mixture layer 18c of the positive electrode sheet 19 were compressed while maintaining the surface temperature T7 of the seventh roll 61 at 25° C. and maintaining the surface temperature T8 of the eighth roll 62 at 200° C. In Comparative Example 3, at step S6 (roll pressing process), the first positive electrode mixture layer 18b and the second positive electrode mixture layer 18c of the positive electrode sheet 19 were compressed while maintaining the surface temperature T7 of the seventh roll 61 at 25° C. and maintaining the surface temperature T8 of the eighth roll 62 also at 25° C.

Thereafter, the density difference (g/cc) between the first positive electrode mixture layer 18b and the second positive electrode mixture layer 18c was examined for the positive electrode sheet 19 of each of Examples 11 to 13 and Comparative Example 3. The results are shown in Table 3. In each of Examples 11 to 13 and Comparative Example 3, in the positive electrode sheet 19 before performing the processing of step S6 (roll pressing process), the density of the first positive electrode mixture layer 18b was higher than the density of the second positive electrode mixture layer 18c, and the density difference (g/cc) between the first positive electrode mixture layer 18b and the second positive electrode mixture layer 18c was 0.85 (g/cc).

TABLE 3

| | Surface Temperature T7 of Seventh Roll (° C.) | Surface Temperature T8 of Eighth Roll (° C.) | Density Difference (g/cc) |
|---|---|---|---|
| Comparative Example 3 | 25 | 25 | 0.68 |
| Example 11 | 25 | 100 | 0.09 |
| Example 12 | 25 | 150 | 0.08 |
| Example 13 | 25 | 200 | 0.1 |

As shown in Table 3, in the positive electrode sheet of Comparative Example 3, the density difference between the first positive electrode mixture layer 18b and the second positive electrode mixture layer 18c was 0.68 (g/cc). On the other hand, in the positive electrode sheet 19 of each of Examples 11 to 13, the density difference between the first positive electrode mixture layer 18b and the second positive electrode mixture layer 18c was equal to or less than 0.1 (g/cc) and thus was extremely small compared to that of Comparative Example 3.

As described above, in Comparative Example 3, the processing of step S6 (roll pressing process) was performed by setting the surface temperature T7 of the seventh roll 61 and the surface temperature T8 of the eighth roll 62 to the same temperature (specifically, 25° C.). On the other hand, in each of Examples 11 to 13, the processing of step S6 (roll pressing process) was performed by setting the surface temperature T8 of the eighth roll 62 to be higher than the surface temperature T7 of the seventh roll 61 (satisfying the relationship of T7<T8).

Also from these results, it can be said that when the processing of step S6 (roll pressing process) is performed by setting the surface temperature T8 of the eighth roll 62 to be higher than the surface temperature T7 of the seventh roll 61 (satisfying the relationship of T7<T8), it is possible to reduce the density difference between the first positive electrode mixture layer 18b and the second positive electrode mixture layer 18c compared to the case where T7<T8. Further, it can be said that the surface temperature T7 of the seventh roll 61 is preferably set to be lower than (Ts-50)° C. being the temperature 50° C. lower than the softening temperature Ts of the binder (PVdF) contained in the positive electrode mixture 6, while the surface temperature T8 of the eighth roll 62 is preferably set to be equal to or higher than (Ts-50)° C. More specifically, it can be said that the surface temperature T7 of the seventh roll 61 is preferably set to the temperature in the range from 15° C. to 35° C.

Study of Diameter of Seventh Roll 61 and Eighth Roll 62

Examples 1, 8, and 11 were the same in that step S6 (roll pressing process) was performed by setting the surface temperature T7 of the seventh roll 61 to 25° C. and setting the surface temperature T8 of the eighth roll 62 to 100° C. (see Tables 1 to 3). However, the diameters (outer diameters) of the seventh rolls 61 and the eighth rolls 62 were different from each other. Specifically, the diameter of the seventh roll 61 and the eighth roll 62 was set to 390 mm in Example 1, was set to 150 mm in Example 8, and was set to 300 mm in Example 11.

As shown in Table 2, in Example 8 in which step S6 (roll pressing process) was performed using the seventh roll 61 and the eighth roll 62 having the diameter of 150 mm, the density difference between the first positive electrode mixture layer 18b and the second positive electrode mixture layer 18c was 0.65 g/cc.

On the other hand, as shown in Table 1, in Example 1 in which step S6 (roll pressing process) was performed using the seventh roll 61 and the eighth roll 62 having the diameter of 390 mm, it was possible to reduce the density difference between the first positive electrode mixture layer 18b and the second positive electrode mixture layer 18c to equal to or less than 0.1 g/cc (specifically, to 0.08 g/cc). Likewise, as shown in Table 3, also in Example 11 in which step S6 (roll pressing process) was performed using the seventh roll 61 and the eighth roll 62 having the diameter of 300 mm, it was possible to reduce the density difference between the first positive electrode mixture layer 18b and the second positive electrode mixture layer 18c to equal to or less than 0.1 g/cc (specifically, to 0.09 g/cc). In this way, in Examples 1 and 11, it was possible to largely reduce the density difference between the first positive electrode mixture layer 18b and the second positive electrode mixture layer 18c compared to Example 8.

From these results, it can be said that the diameter of the seventh roll 61 and the eighth roll 62 is preferably set to 300 mm or more. More specifically, it can be said that, by performing the roll pressing process (step S6) such that the surface temperature T7 of the seventh roll 61 and the surface temperature T8 of the eighth roll 62, having the diameter of 300 mm or more, satisfy the relationship of T7<T8, the compressibility of the second positive electrode mixture layer 18c by this roll pressing can be effectively increased. It can be said that this makes it possible to further reduce the density difference between the first positive electrode mixture layer 18b and the second positive electrode mixture layer 18c. This is also supported by comparison of the density differences in Examples 2, 9, and 12 and comparison of the density differences in Examples 3, 10, and 13.

While the disclosure has been described with reference to the embodiment (Examples 1 to 13), it goes without saying that the disclosure is not limited to the above-described embodiment and is applicable with appropriate changes within a range not departing from the gist of the disclosure. For example, in the embodiment, the method of manufacturing the positive electrode sheet has been described by way of example as a method of manufacturing an electrode sheet according to the disclosure. However, the disclosure may also be applied to a method of manufacturing a negative electrode sheet.

In the embodiment, the first drying process (step S3) for drying the first positive electrode mixture layer 18b formed on the first surface 7b of the collector foil 7 is provided after the first film forming process (step S2) and before the second film forming process (step S4). Further, the second drying process (step S5) for drying the second positive electrode mixture layer 18c formed on the second surface 7c of the collector foil 7 is provided after the second film forming process (step S4) and before the roll pressing process (step S6). However, it may be configured that the roll pressing process (step S6) is performed without performing the first drying process (step S3) and the second drying process (step S5).

Even in such a case, when the processing of step S6 (roll pressing process) is performed by setting the surface temperature T8 of the eighth roll 62 to be higher than the surface temperature T7 of the seventh roll 61 (satisfying the relationship of T7<T8), it is possible to reduce the density difference between the first positive electrode mixture layer 18b and the second positive electrode mixture layer 18c compared to the case where T7<T8. Further, it can be said that the surface temperature T7 of the seventh roll 61 is preferably set to be lower than (Ts-50)° C. being the temperature 50° C. lower than the softening temperature Ts of the binder (PVdF) contained in the positive electrode mixture 6, while the surface temperature T8 of the eighth roll 62 is preferably set to be equal to or higher than (Ts-50)° C. More specifically, it can be said that the surface temperature T7 of the seventh roll 61 is preferably set to the temperature in the range from 15° C. to 35° C.

What is claimed is:

1. A method of manufacturing an electrode sheet including a first electrode mixture layer on a first surface of a collector foil having the first surface and a second surface, and a second electrode mixture layer on the second surface, the method comprising:

performing first film formation such that while an electrode mixture containing a plurality of wet granules obtained by mixing and granulating an electrode active material, a binder, and a solvent is formed into a film shape by passing the electrode mixture through a gap between a first roll and a second roll facing each other and rotating, the electrode mixture formed into the film shape is adhered to a surface of the second roll, and that while the second surface of the collector foil conveyed by a third roll facing the second roll and rotating is brought in contact with a surface of the third roll, the collector foil is passed through a gap between the second roll and the third roll to cause the film-shaped electrode mixture adhering to the surface of the second roll to be pressed against and transferred to the first surface of the collector foil so as to produce a first electrode mixture layer coated collector foil in which the first electrode mixture layer is formed on the first surface of the collector foil;

performing second film formation such that while the electrode mixture is formed into a film shape by passing the electrode mixture through a gap between a fourth roll and a fifth roll facing each other and rotating, the electrode mixture formed into the film shape is adhered to a surface of the fifth roll, and that while the first electrode mixture layer of the first electrode mixture layer coated collector foil conveyed by a sixth roll facing the fifth roll and rotating is brought in contact with a surface of the sixth roll, the first electrode mixture layer coated collector foil is passed through a gap between the fifth roll and the sixth roll to cause the film-shaped electrode mixture adhering to the surface of the fifth roll to be pressed against and transferred to the second surface of the first electrode mixture layer coated collector foil so as to produce the electrode sheet in which the second electrode mixture layer is formed on the second surface of the first electrode mixture layer coated collector foil; and performing roll pressing such that the first electrode mixture layer and the second electrode mixture layer are compressed in a thickness direction of the first electrode mixture layer and the second electrode mixture layer by passing the electrode sheet through a gap between a seventh roll and an eighth roll facing each other and rotating, wherein when performing the roll pressing, T7 as a surface temperature of the seventh roll disposed on a first electrode mixture layer side and contacting the first electrode mixture layer and T8 as a surface temperature of the eighth roll disposed on a second electrode mixture layer side and contacting the second electrode mixture layer satisfy a relationship of T7<T8.

2. The method according to claim 1, wherein when performing the roll pressing, T7 as the surface temperature of the seventh roll is maintained at a temperature lower than (Ts-50)° C. being a temperature 50° C. lower than Ts as a softening temperature of the binder contained in the electrode mixture, and T8 as the surface temperature of the eighth roll is maintained at a temperature equal to or higher than (Ts-50)° C.

3. The method according to claim 1, wherein when performing the roll pressing, T7 as the surface temperature of the seventh roll is maintained at a temperature in a range from 15° C. to 35° C.

4. The method according to claim 1, wherein the seventh roll and the eighth roll have a diameter of 300 mm or more.

* * * * *